Sept. 9, 1941.  A. H. LAUDER  2,255,490
PROTECTIVE SYSTEM FOR ALTERNATING CURRENT DYNAMOELECTRIC MACHINES
Filed Nov. 8, 1940

Inventor:
Arthur H. Lauder,
by Harry E. Dunham
His Attorney.

Patented Sept. 9, 1941

2,255,490

UNITED STATES PATENT OFFICE 2,255,490

PROTECTIVE SYSTEM FOR ALTERNATING CURRENT DYNAMOELECTRIC MACHINES

Arthur H. Lauder, Schenectady, N. Y., assignor to General Electric Company, a corporation of New York Application November 8, 1940, Serial No. 364,852

5 Claims. (Cl. 172—289)

My invention relates to protective systems and particularly to a system for protecting the secondary winding of a polyphase motor when only a portion of its primary winding is energized and the motor is operating at a subsynchronous speed, and one object of my invention is to provide an improved protective arrangement for preventing a voltage of sufficient magnitude to break down the insulation of the secondary winding, from being built up in any portion of the secondary winding under such subsynchronous operation.

In United States Letters Patent 2,180,174 granted November 14, 1939 to the assignee of this application, there is disclosed and claimed an arrangement for limiting the voltages induced in the secondary winding of a polyphase motor under such subsynchronous conditions. The specific arrangement disclosed in the aforesaid Letters Patent consisted of low impedance shunt circuits connected around different portions of the secondary winding. In practice these low impedance shunt circuits have usually consisted of low impedance devices, such as resistors, which have been mounted on the rotor and permanently connected in shunt with different portions of the secondary winding. When the motor has a large number of poles, these shunt resistors become quite bulky, and it is difficult to find enough room on the rotor to mount them.

In accordance with my present invention, I connect the various portions of the secondary winding in a new and novel manner so that the low impedance shunting means can be mounted outside of the motor or on the stator of the motor without requiring a large number of slip rings between the rotating secondary winding and the stationary shunting means.

Figure 1:
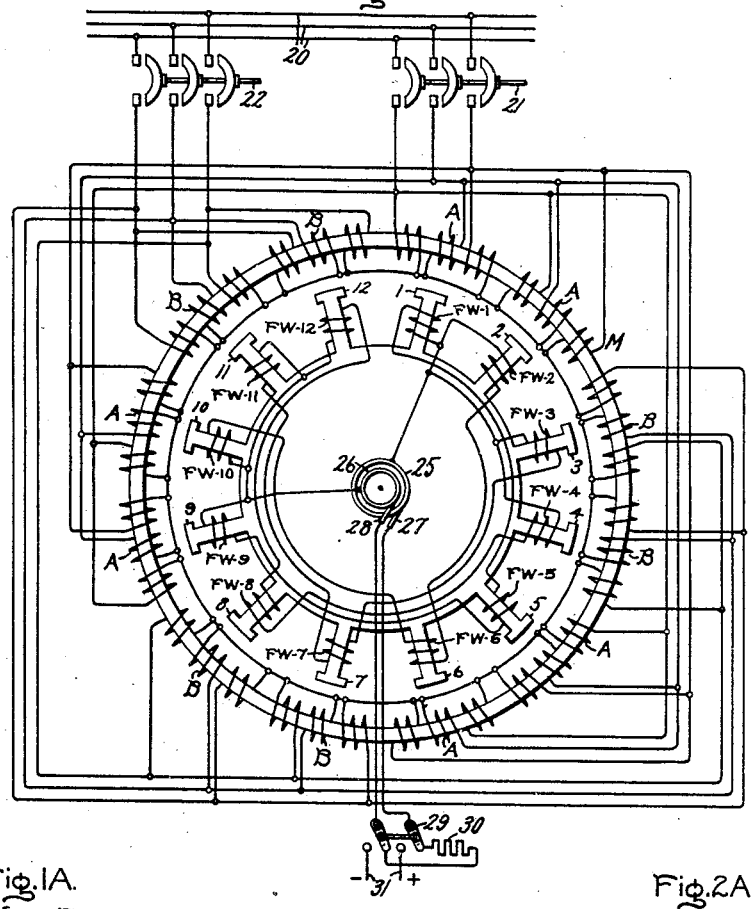
Figure 1A:
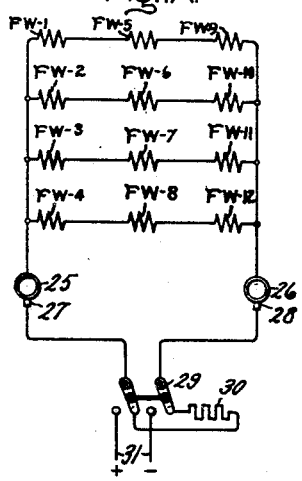
Figure 2:
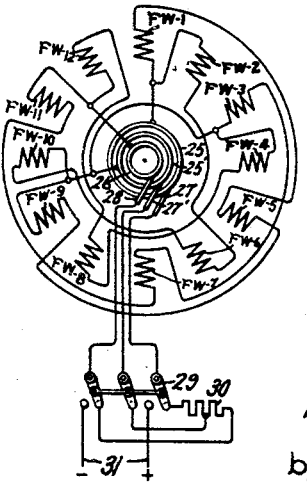
Figure 2A:
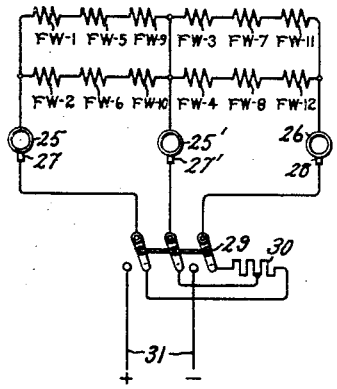

My invention will be better understood from the following description when taken in connection with the accompanying drawing, Fig. 1 of which diagrammatically illustrates a synchronous motor and control therefor embodying my invention, Fig. 1A of which is a simplified wiring diagram of the field winding connections shown in Fig. 1, Fig. 2 of which shows a different connection of the field windings, which may be used instead of the embodiment shown in Fig. 1, and Fig. 2A of which is a wiring diagram of the field winding connections shown in Fig. 2, and the scope of my invention will be pointed out in the appended claims.

Referring to Fig. 1 of the drawing, M represents a three phase synchronous motor having two groups of primary or armature windings A and B on its stator. In order to explain my invention, I have illustrated it in connection with a twelve pole motor, but it will be obvious to those skilled in the art that my invention is not limited to a motor having this particular number of poles. In the particular embodiment of my invention shown in Fig. 1, the group of windings A is arranged on the stator so as to produce alternate pairs of poles, and the group of windings B is arranged on the stator so as to produce the intermediate pairs of poles. Consequently, when only one of the groups of windings is energized, alternate pairs of poles are active and the intermediate pairs of poles are inactive. For example, if the twelve poles which are produced by the two winding groups were numbered consecutively from 1 to 12, inclusive, the group of windings A, when energized, would render the poles 1, 2, 5, 6, 9 and 10 active, and the group of windings B, when energized, would render the poles 3, 4, 7, 8, 11 and 12 active.

The group of windings A is arranged to be connected to a polyphase source of current 20 by suitable switching means 21, and the group of windings B is arranged to be connected to the polyphase source 20 by suitable switching means 22. Although these switching means 21 and 22 are shown as being manually operated, it is obvious that they may be automatically operated in any suitable manner. Preferably the motor M is started by closing one of the switching means so that only one group of armature windings is energized to start the motor from rest. After the motor has reached a predetermined speed, the other switching means is then operated so that both groups of armature windings are energized during the normal synchronous operation of the motor.

The rotor of the synchronous motor M has the same number of polar projections 24 as there are poles produced by the two groups of primary windings A and B, namely twelve. On each of these twelve polar projections is wound a field winding. These twelve field windings are numbered consecutively FW—1 to FW—12, inclusive. When only one group of armature windings is energized and the motor is operating subsynchronously, each of the field windings successively passes an active pair of armature poles and an inactive pair of armature poles so that at any instant there are alternate groups of two field windings which are closely coupled with energized armature windings and intermediate groups of two field windings which are closely coupled with deenergized armature windings. As the rotor continues to slip, one of the field windings in each group, which formerly was closely coupled with an energized armature winding, becomes closely coupled with a deenergized armature winding and one of the field windings, which formerly was closely coupled with a deenergized armature winding, becomes closely coupled with an energized winding. Therefore, it will be seen that certain of the field windings are at all times simultaneously coupled with similarly energized armature windings. In the particular embodiment shown in Fig. 1 the field windings, which are four poles apart, constitute a group of windings all of which are at all times simultaneously coupled with similarly energized armature windings.

In accordance with my invention, I connect the field windings of each such group in series in an individual circuit and connect suitable low impedance means across each such series circuit so as to limit the voltage induced therein to a safe value. Therefore, in the particular arrangement shown in Fig. 1 the field windings FW—1, FW—5 and FW—9 are connected in series in an individual circuit, and similarly, field windings FW—2, FW—6 and FW—10 and field windings FW—3, FW—7 and FW—11 and field windings FW—4, FW—8 and FW—12 are connected in series in individual circuits. This will be more clearly seen from the wiring diagram shown in Fig. 1A. Each of these individual circuits terminates at the slip rings 25 and 26, which are engaged by the brushes 27 and 28, respectively. The brushes 27 and 28 are connected to a two-position switch 29 which in one position connects a discharge resistor 30 across the slip rings 25 and which in its other position connects a suitable source of excitation 31 across the slip rings 25 and 26.

When it is desired to start the motor M, the switch 29 is moved to its position in which the discharge resistor 30 is connected across the slip rings 25 and 26 which is the position in which the switch 29 is shown and then either the switch 21 or 22 is closed to energize one group of armature windings from the alternating current source 20. The motor then starts and accelerates as an induction motor to approximately synchronous speed. As each group of series connected field windings becomes closely coupled with the energized group of armature windings during the induction motor operation of the motor, the voltage induced in this group of field windings is prevented from building up higher than a predetermined value because the circuit is at all times shunted by the low discharge resistor 30 and, therefore, substantially none of the induced current in the series connected field windings, which are closely coupled with the energized armature windings, has to flow through the field windings which are closely coupled with the deenergized armature windings.

After the motor reaches a predetermined speed, the other group of armature windings is connected to the alternating source 20 and the switch 29 is moved to its other position so that the source of excitation 31 is connected across each of the individual series connected field winding circuits.

In some cases it is desirable to use a source of excitation of relatively high voltage. In such cases it may be necessary to have a larger number of field windings connected in series across the source than are connected in series, in accordance with my invention, in each of the individual circuits. For example, the voltage of the exciter 30 may be such that it is desirable to have six of the field windings connected in series across the source of excitation 31 when the switch 29 is closed for synchronous operation of the motor. Figs. 2 and 2A show a modification of the arrangement shown in Figs. 1 and 1A whereby this result may be obtained. Instead of connecting all of the four individual circuits of series connected field windings in parallel across the whole of the discharge resistor 30, two of these field winding circuits are connected across half of the discharge resistor and the other two circuits are connected across the other half of the discharge resistor. In order to accomplish this result, an additional slip ring 25' and cooperating brush 27' and an additional blade on the switch 29 are required.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a dynamo-electric machine having a plurality of groups of primary windings, each group being arranged when energized to produce a plurality of groups of adjacent magnetic poles and having a secondary winding comprising the same number of sections as there are magnetic poles produced by said primary windings, means for energizing said groups of primary windings in a predetermined sequence, means interconnecting said sections so that when only a portion of said groups of primary windings is energized and said machine is operating subsynchronously the sections which at all times are simultaneously coupled with similarly energized primary windings are connected in series in an individual circuit, and means for limiting the voltage induced in each of said circuits.

2. In combination, a dynamo-electric machine having a plurality of groups of primary windings, each group being arranged when energized to produce a plurality of groups of adjacent magnetic poles and having a secondary winding comprising the same number of sections as there are magnetic poles produced by said primary windings, means for energizing said groups of primary windings in a predetermined sequence, means interconnecting said sections so that when only a portion of said groups of primary windings is energized and said machine is operating subsynchronously the sections which at all times are simultaneously coupled with similarly energized primary windings are connected in series in an individual circuit, and low impedance means connected across each of said circuits.

3. In combination, a synchronous motor having a plurality of groups of primary windings on its stator, each group being arranged when energized to produce a plurality of groups of adjacent magnetic poles, a plurality of field magnet windings on the rotor of said motor equal in number to the total number of poles produced by said primary windings, means for energizing said groups of primary windings in a predetermined sequence, means interconnecting said field windings so that when only a portion of said groups of primary windings is energized and said machine is operating subsynchronously the field windings which at times are simultaneously coupled with similarly energized primary windings are connected in series in an individual circuit, and means for limiting the voltage induced in each of said circuits.

4. In combination, a synchronous motor having a plurality of groups of primary windings on its stator, each group being arranged when energized to produce a plurality of groups of adjacent magnetic poles, a plurality of field magnet windings on the rotor of said motor equal in number to the total number of poles produced by said primary windings, means for energizing said groups of primary windings in a predetermined sequence, means interconnecting said field windings so that when only a portion of said groups of primary windings is energized and said machine is operating subsynchronously the field windings which at times are simultaneously coupled with similarly energized primary windings are connected in series in an individual circuit, and a discharge resistor connected across each of said circuits.

5. In combination, a synchronous motor having a plurality of groups of primary windings on its stator, each group being arranged when energized to produce a plurality of groups of adjacent magnetic poles, a plurality of field magnet windings on the rotor of said motor equal in number to the total number of poles produced by said primary windings, means for energizing said groups of primary windings in a predetermined sequence, means interconnecting said field windings so that when only a portion of said groups of primary windings is energized and said machine is operating subsynchronously the field windings which at times are simultaneously coupled with similarly energized primary windings are connected in series in an individual circuit, a discharge resistor, a source of excitation, and switching means for connecting said circuits to said resistor and to said source.

ARTHUR H. LAUDER.